(12) United States Patent
Browne

(10) Patent No.: US 8,523,215 B2
(45) Date of Patent: Sep. 3, 2013

(54) MIDDLE HOOP SYSTEM FOR AN ARTICULATED VEHICLE

(75) Inventor: Denis B. Browne, Trittau (DE)

(73) Assignee: ATG Autotechnik GmbH, Siek (DE)

( * ) Notice: Subject to any disclaimer, the term of this patent is extended or adjusted under 35 U.S.C. 154(b) by 186 days.

(21) Appl. No.: 13/101,371

(22) Filed: May 5, 2011

(65) Prior Publication Data

US 2011/0272915 A1 Nov. 10, 2011

(30) Foreign Application Priority Data

May 5, 2010 (EP) .................................... 10004759

(51) Int. Cl.
*B61D 17/20* (2006.01)
*B60D 5/00* (2006.01)

(52) U.S. Cl.
CPC .. *B61D 17/20* (2013.01); *B60D 5/00* (2013.01)
USPC .............................. 280/403; 105/8.1; 280/420

(58) Field of Classification Search
USPC ......... 280/403, 424, 420–422; 105/8.1–25.1; 296/178
See application file for complete search history.

(56) References Cited

U.S. PATENT DOCUMENTS

| | | | | |
|---|---|---|---|---|
| 2,843,417 A * | 7/1958 | Georg et al. | .................. | 280/403 |
| 3,137,514 A * | 6/1964 | Georg | ............................ | 280/403 |
| 4,247,128 A * | 1/1981 | Knapp et al. | .................. | 280/403 |
| 6,076,470 A * | 6/2000 | Koch | ............................. | 105/8.1 |
| 2010/0283223 A1* | 11/2010 | Browne | ........................ | 280/403 |

FOREIGN PATENT DOCUMENTS

| | | |
|---|---|---|
| CH | 363 896 A | 8/1962 |
| DE | 28 54 416 A1 | 6/1980 |
| DE | 3126095 A1 * | 2/1983 |
| DE | 35 45 863 A1 | 6/1987 |
| DE | 197 14 543 C1 | 8/1998 |
| DE | 102 38 110 A1 | 3/2004 |
| DE | 202007001525 U1 | 4/2007 |
| EP | 0897337 | 6/2000 |
| WO | WO91/02672 | 3/1991 |

OTHER PUBLICATIONS

English Abstract of CH363896A.
English Abstract of DE2854416A1.
English Abstract of DE3545863A1.
English Abstract of DE10238110A1.
English Abstract of DE19714543C1.
English Abstract of DE202007001525U1.
English Abstract of WO9102672A1.

* cited by examiner

*Primary Examiner* — Paul N Dickson
*Assistant Examiner* — Wesley Potter
(74) *Attorney, Agent, or Firm* — Alix, Yale & Ristas, LLP

(57) ABSTRACT

A middle hoop system for a vehicle joint is arranged between a vehicle front part and a vehicle rear part of a vehicle. The middle hoop forms a passage between the vehicle front part and the vehicle rear part, the middle hoop surrounding the passage. A cable which is arranged above the passage extends along a curved path between the vehicle front part and the vehicle rear part. A bearing is provided between the cable and the middle hoop. The bearing has a guide surface permitting a relative movement in the longitudinal direction of the vehicle between the cable and the middle hoop. The cable is subject to a smaller load by the middle hoop system.

20 Claims, 4 Drawing Sheets

MIDDLE HOOP SYSTEM FOR AN ARTICULATED VEHICLE

BACKGROUND

The invention relates to a middle hoop system for an articulated vehicle. The articulated vehicle comprises a vehicle front part and a vehicle rear part which are connected to each other by a vehicle joint. There is a passage between the vehicle front part and the vehicle rear part, which passage is surrounded by the middle hoop. The middle hoop system comprises a cable which extends along a curved path between the vehicle front part and the vehicle rear part. The cable is arranged above the passage. A bearing is provided between the cable and the middle hoop.

Middle hoop systems of this type are used, for example, in articulated buses, in which it is possible for the passengers to pass between the vehicle front part and the vehicle rear part while the vehicle is traveling. To protect the passengers from environmental influences, a bellows is typically provided between the vehicle front part and the vehicle rear part, which bellows surrounds the vehicle joint.

In said articulated vehicles, there are technical functions which relate both to the vehicle front part and to the vehicle rear part. For example, if the driver, who is seated in the vehicle front part, actuates the light switch, this should also result in a rear lighting system of the vehicle rear part being illuminated. In order to enable this, an electrical cable extends from the vehicle front part via the intermediate space as far as the vehicle rear part. Further functions require hydraulic lines, air hoses and other supply lines between the vehicle front part and the vehicle rear part.

In low-floor vehicles, in which the floor intended for the passengers is arranged as low as possible, only a small amount of space remains below the passage which connects the vehicle front part and the vehicle rear part. There is more space available above the passage, and therefore the cables are frequently laid there.

SUMMARY

A middle hoop system with improved cable mounting employs a bearing which has a guide surface. The guide surface permits a relative movement in the longitudinal direction of the vehicle between the cable and the middle hoop.

The bearing permits a relative movement in the transverse direction of the vehicle between the cable and the middle hoop. The bearing in one embodiment comprises a ball ring on the guide surface. The bearing may also provide defined guidance in the vertical direction. The guide surface may also be provided with an encircling border. A cable guide extends between the vehicle front part and the vehicle rear part. The cable is fastened to the cable guide.

In one embodiment, the cable guide defines a path of fixed length between the vehicle front part and the vehicle rear part. The cable guide may comprise a leaf spring.

In some embodiments, a strut rod is coupled to the middle hoop and permits rotation of the middle hoop about a vertical axis. The strut rod produces a connection to the vehicle front part or to the vehicle rear part. The distance between the middle hoop and the vehicle front part or vehicle rear part, which distance is defined by the strut rod in the normal state, is at the same time the minimum distance. The distance between the middle hoop and the vehicle front part or vehicle rear part, which distance is defined by the strut rod in the normal state, can be increased by tensile force.

Some terms will be explained first. Within the context of the present disclosure, cables serve to link technical functions of the vehicle front part and of the vehicle rear part to one another. The term "cable" encompasses all supply lines via which signals or forces are transmitted between the vehicle front part and the vehicle rear part. The term "cable" encompasses, in particular, electrical cables, glass fiber lines, hydraulic lines, air hoses for an air-conditioning system and heating system. A plurality of cables of this type generally extends between the vehicle front part and the vehicle rear part. The mounting may include all or some of said cables.

The term "bearing" implies that the cable guide and the middle hoop cannot move freely relative to each other. The freedom of movement between the cable guide and the middle hoop is restricted in at least one direction by the bearing. The relative movement takes place parallel to the guide surface of the bearing. A relative movement between the cable and the middle hoop is possible at least in the longitudinal direction of the vehicle; it may additionally be possible in other directions. The longitudinal direction of the vehicle encloses a right angle with the middle hoop.

The movements taking place between the vehicle front part and the vehicle rear part during operation of the articulated vehicle are complex. Said movements include rotation, pitching, rolling and combinations thereof. The movements which are executed by the cable and the middle hoop in the intermediate space between the vehicle front part and the vehicle rear part are not inevitably synchronous. If the cables are connected rigidly to the middle hoop or, as in EP0897337, relative movements are permitted only parallel to the middle hoop, there is the risk of the cables or the middle hoop being forced into unnecessary movements. If, according to the present disclosure, a relative movement is possible in the longitudinal direction of the vehicle, forces are transmitted between the middle hoop and the cable only to a smaller extent, and said components are subject to a smaller load.

The bearing can be designed in such a manner that, apart from the relative movement in the longitudinal direction of the vehicle, it also permits a relative movement in the transverse direction of the vehicle. As a result, the transmission of forces between the middle hoop and the cable and forced movements of said two components are further reduced.

In some embodiments, the guide surface is connected to the middle hoop, and in other embodiments, the guide surface is connected to the cable. The counterpart of the bearing is attached to the other component in each case. The counterpart of the bearing can slide on the guide surface. For this purpose, the surface of the counterpart can comprise a material which is favorable for sliding or can be provided with a coating which is favorable for sliding. In an advantageous embodiment, the counterpart comprises a ball which runs on the guide surface.

The guide surface may be flat. The flat guide surface may be oriented horizontally. The relative movement between the middle hoop and the cable in the longitudinal direction of the vehicle then takes place without a simultaneous relative movement in the vertical direction. Embodiments are also included, in which the guide surface is curved. Depending on the position of the counterpart on the guide surface, a combined relative movement then takes place in the horizontal direction and in the vertical direction. One component of the possible relative movement is oriented in the longitudinal direction of the vehicle.

The counterpart can rest freely on the guide surface and can be held, for example, merely by the weight on the guide surface. If the weight is overcome, the counterpart in this embodiment can be raised from the guide surface. A border delimiting the guide surface can be provided, and therefore the counterpart cannot jump down from the guide surface. For some embodiments, defined guidance of the counterpart on the guide surface is provided in the vertical direction. For example, the counterpart can be guided between two opposite guide surfaces which are oriented parallel to each other. The counterpart can then not be lifted off either from the one or the other guide surface.

In order to be able to absorb movements between the vehicle front part and the vehicle rear part, the cable takes a curved path in the intermediate space between the vehicle front part and the vehicle rear part. In order not to unnecessarily restrict the ceiling height in the passage, the curved path should extend substantially on a horizontal plane. In an advantageous embodiment, a cable guide is provided, on which the cable path in the intermediate space between the vehicle front part and the vehicle rear part can be oriented. The cable guide preferably has a fixed length. The cable guide can comprise, for example, a leaf spring which is fastened to the vehicle front part and to the vehicle rear part and, in the intermediate space, takes substantially the same path as the cable. The leaf spring refers to an elongate element which can easily be elastically deformed in a direction transversely with respect to the longitudinal direction thereof and can be elastically deformed with more difficulty in another direction. It is also possible for the cable guide to comprise rigid strut rods which are suspended in a suitable manner on joints such that said strut rods can absorb movements between the vehicle front part and the vehicle rear part.

In some articulated vehicles, the middle hoop is guided in such a manner that it always take up a central position between the vehicle front part and the vehicle rear part. With a middle hoop of this type, the mounting according to the invention for the cable can be readily used. Use is also possible with middle hoops which, during operation of the articulated vehicle, are not fixed to a central position between the vehicle front part and the vehicle rear part. For example, the middle hoop can be held by means of a strut rod at a fixed distance from the vehicle front part or the vehicle rear part. The strut rod can be coupled to the middle hoop and can permit rotation of the middle hoop about a vertical axis. If the middle hoop is held at a fixed distance from one of the vehicle parts by a strut rod of this type, pitching movements are compensated for by a relative movement between the middle hoop and the other vehicle part.

Instead of a completely rigid link, a connection may also be provided which is rigid in relation to compressive forces, but can be extended under tensile forces. If the articulated vehicle travels over a bump and the distance between the vehicle front part and the vehicle rear part therefore increases in the upper region, the middle hoop can move further away from that vehicle part to which the connection exists and can therefore contribute to spanning the distance. The distance between the middle hoop and the vehicle front part or vehicle rear part, which distance is defined by the strut rod in the normal state, is then at the same time the minimum distance. However, the distance can be increased by tensile force.

BRIEF DESCRIPTION OF THE DRAWINGS

The invention is described below using advantageous embodiments and with reference to the attached drawings, in which.

DETAILED DESCRIPTION

Figure 1:
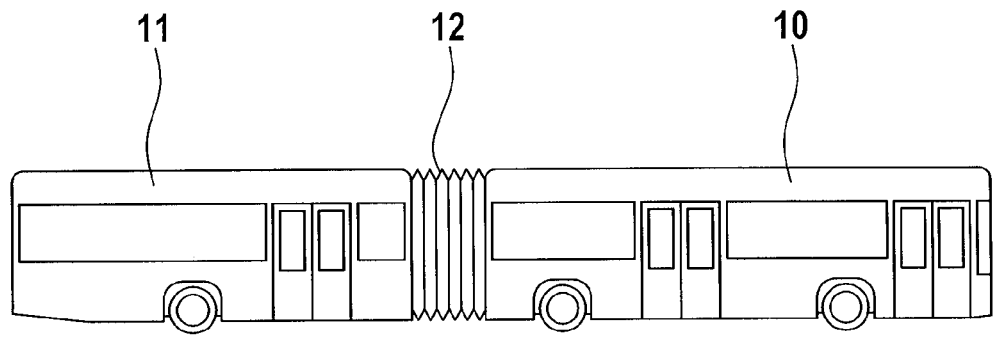
FIG. 1 shows a side view of an articulated vehicle.

An articulated bus which is shown in FIG. 1 comprises a vehicle front part 10 and a vehicle rear part 11. The vehicle front part 10 and the vehicle rear part 11 are connected to each other via a vehicle joint (not illustrated in FIG. 1) in such a manner that passengers can change between the vehicle front part 10 and the vehicle rear part 11 through a passage 33 while the vehicle is traveling. A bellows 12 surrounds the vehicle joint and the passage 33. The middle hoop system is arranged in the intermediate space between the vehicle front part 10 and the vehicle rear part 11 and is concealed in FIG. 1 by the bellows 12.

Figure 2:
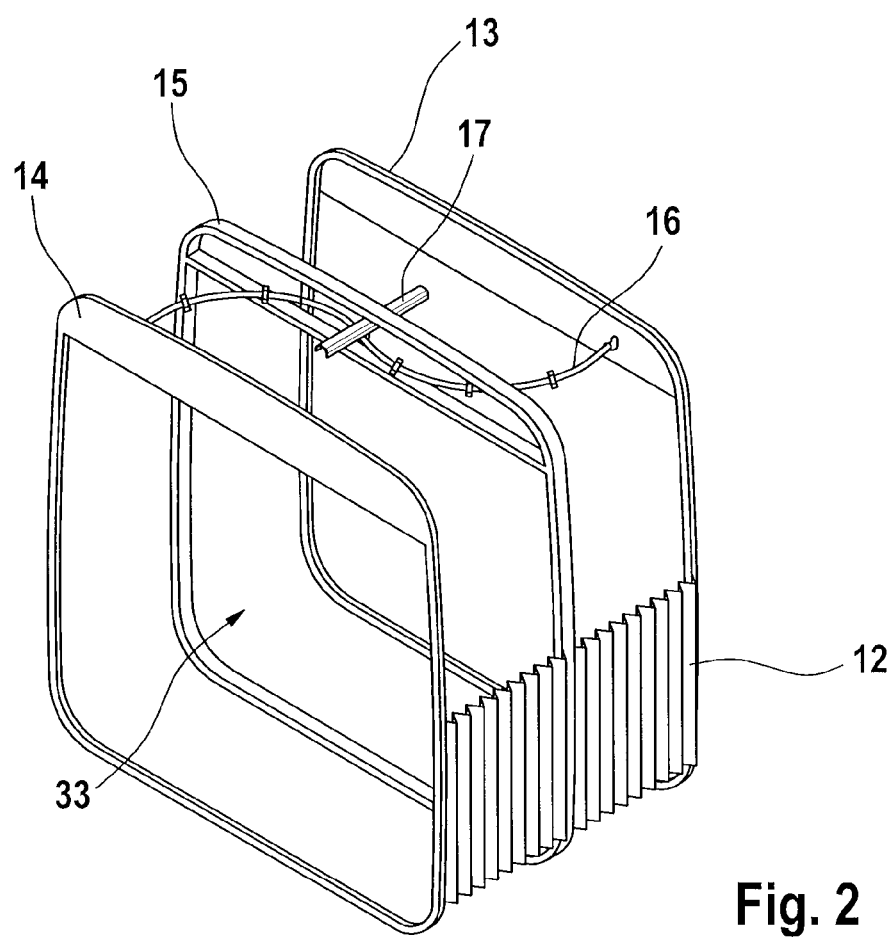
FIG. 2 shows a perspective view of a middle hoop system.

FIG. 2 shows the end frame 13 of the vehicle front part 10 and the end frame 14 of the vehicle rear part 11. Only sections of the bellows 12 are shown in FIG. 2. A middle hoop 15 providing the bellows 12 with additional support is arranged between the end frame 13 and the end frame 14. A cable 16 extends from the end frame 13 to the end frame 14. The cable 16 takes a curved path, which extends substantially in a horizontal plane, in the intermediate space between the vehicle front part 10 and the vehicle rear part 11. As a result, the cable 16 is capable of compensating for movements executed by the vehicle front part 10 and the vehicle rear part 11 relative to each other. The cable 16 is mounted in a sliding guide 17 on the middle hoop 15. In the sliding guide 17, the cable 16 can move along a guide surface in the longitudinal direction of the vehicle relative to the middle hoop 15. In addition, the cable 16 can also rotate relative to the sliding guide 17. With the sliding guide 17, restricted guidance between the cable 16 and the middle hoop 15 is dispensed with. The cable 16 and the middle hoop 15 can take up the position, in which they are subject to the smallest possible load, independently of each other.

Figure 3:
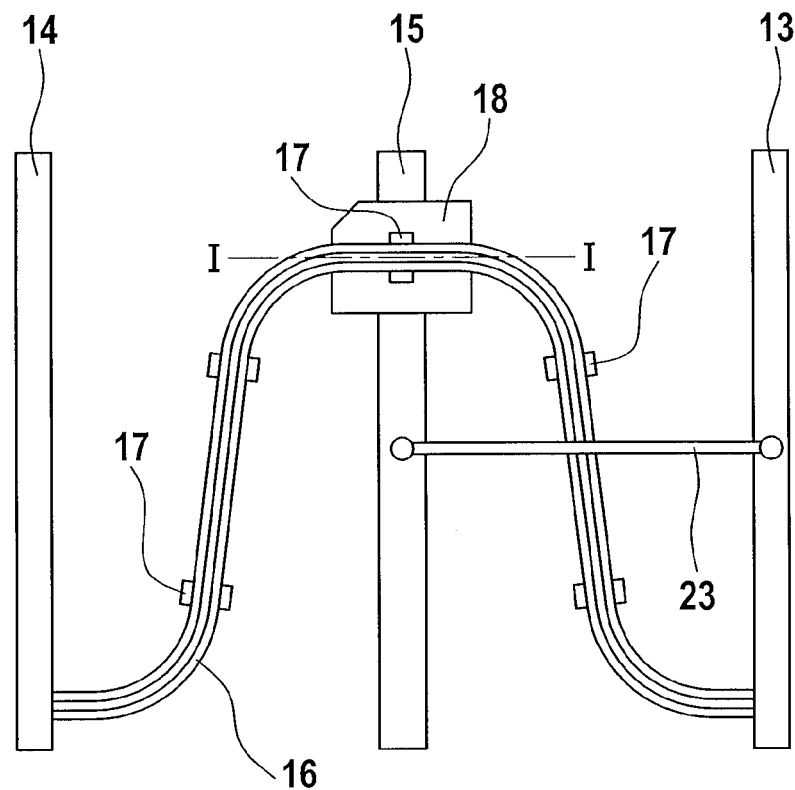
FIG. 3 shows a schematic view from above of a middle hoop system.
Figure 4:
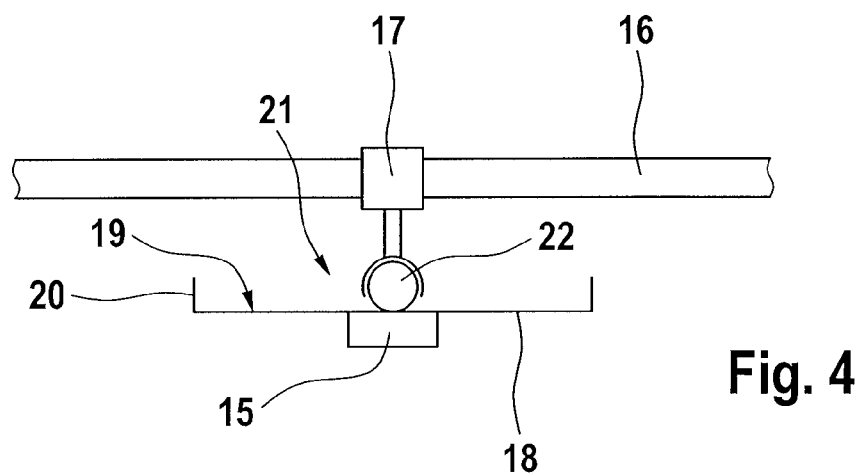
FIG. 4 shows a section along the line I-I in FIG. 3.

In the embodiment of FIG. 3, a plurality of cables 16 extends between the end frame 13 and the end frame 14. The cables 16 are held parallel to each other in a horizontal plane by means of suitable clamps 17 such that they extend in the form of a uniform strand through the intermediate space between the end frame 13 and the end frame 14.

The cables 16 are mounted on the middle hoop 15 by means of a guide surface 19 and a counterpart 21 interacting with the guide surface 19. The guide surface 19 is formed by the base of a bearing trough 18. The counterpart 21 is formed by a ball 22 which is guided on a clip 17 of the cables 16. When the middle hoop 15 and the cables 16 move relative to one another, the ball 22 rolls along the guide surface 19. The cables 16 and the middle hoop 15 can therefore move independently of one another in such a manner that they are subject to the smallest possible forces. The freedom in respect of relative movements exists both in the longitudinal direction and in the transverse direction of the vehicle.

The ball 22 rests on the guide surface 19 solely owing to the weight of the cables 16. If the weight is overcome, the ball 22 can readily be lifted off from the guide surface 19. The ball 22 cannot be prevented from being lifted off from the guide surface 19 when the vehicle is traveling over an uneven section or over other means causing shaking. This does not have a damaging effect on the functioning capability of the middle hoop system because the guide surface 19 is of a size sufficient to cover the entire region in which the ball 22 can normally move. Even if the ball 22 is lifted off, it therefore lands again on the guide surface 19. In order, nevertheless, to provide additional protection against the ball 22 jumping down off the guide surface 19, the guide surface 19 is surrounded all the way around by a border 20.

In this embodiment, the middle hoop 15 is connected to the end frame 13 via a rigid strut rod 23. The strut rod 23 is connected both to the end frame 13 and to the middle hoop 15 via a joint which permits pivoting movements about a vertical axis of articulation. Therefore, if the articulated bus travels around a corner and buckles in the lateral direction, the middle hoop 15 can complete the corresponding pivoting movement such that it permanently takes up approximately a central position between the end frame 13 and the end frame 14. However, if the articulated bus travels over a bump, the corresponding pitching movement is compensated for only between the middle hoop 15 and the end frame 14. The distance between the end frame 13 and the middle hoop 15 remains constant owing to the strut rod 23. During pitching movements, the middle hoop 15 is therefore not in a central position between the end frame 13 and the end frame 14.

If a strut rod 23 is provided, the ball 22 does not move into that corner of the bearing trough 18 which is illustrated at the top left in FIG. 3. The bearing trough 18 is therefore beveled at said corner; i.e. a piece is missing as compared with a rectangular shape.

Figure 5:
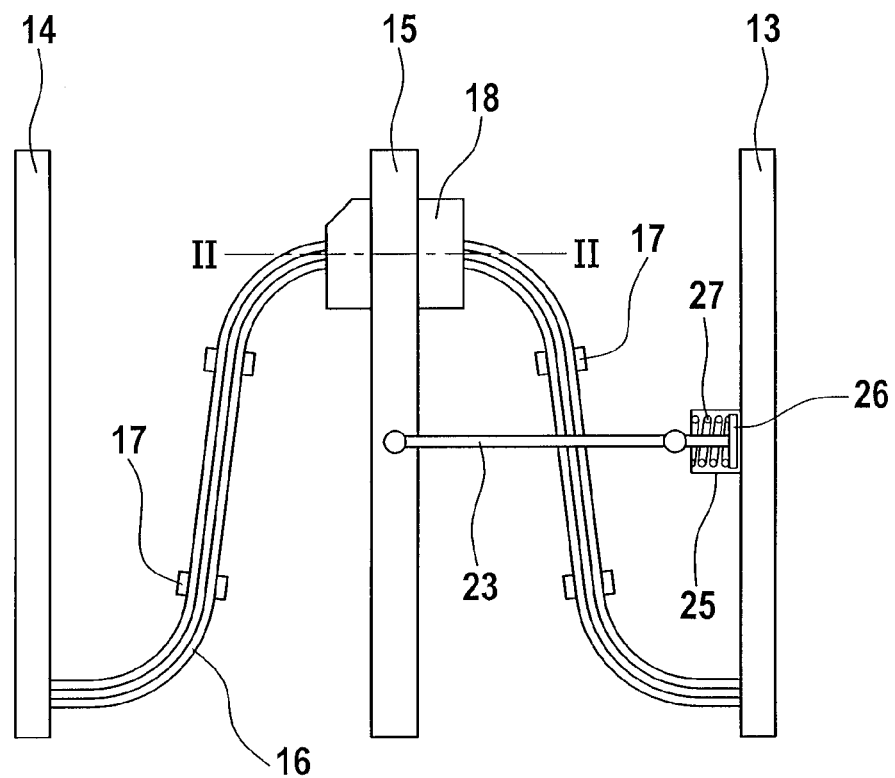
FIG. 5 shows the view from FIG. 3 for another embodiment.
Figure 6:
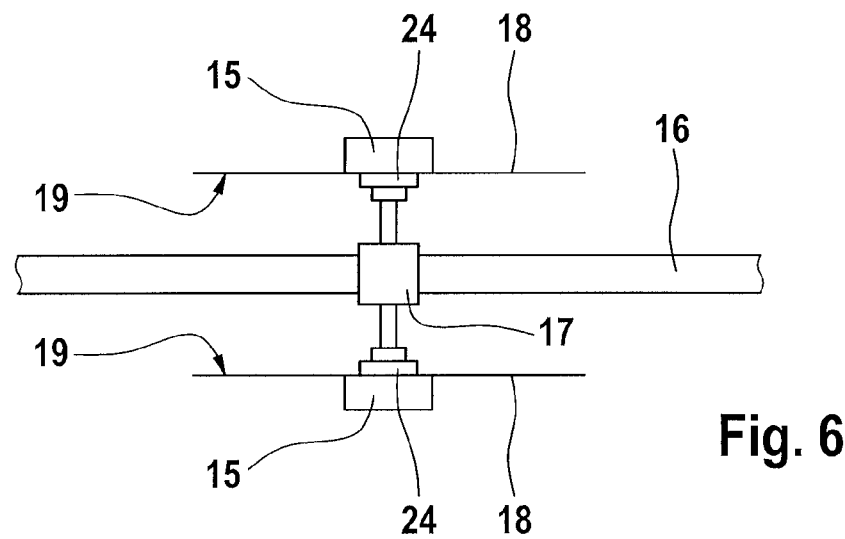
FIG. 6 shows a section along the line II-II in FIG. 5.

In the embodiment of FIG. 5, the cables 16 are guided between two transverse rods of the middle hoop 15. A bearing trough 18 is attached to each of the transverse rods. The guide surfaces 19 of the bearing troughs 18 are opposite each other in parallel such that the cables 16 are enclosed between two guide surfaces 19. Sliding pieces 24 are attached to the clip 17 of the cables 16, said sliding pieces sliding on the guide surfaces 19 and thereby permitting a relative movement between the cables 16 and the middle hoop 15. In this embodiment, the cable 16 is subject to defined guidance in the vertical direction. An encircling border for the guide surfaces 19 is not required.

A strut rod 23 also extends here between the central hoop 15 and the end frame 13. Joints permitting the pivoting movements about a vertical axis of articulation are formed at both ends of the strut rod 23. The strut rod 23 is not connected to the end frame 13 rigidly but rather via a spring element 25. The spring element 25 comprises a stamp 26 which is guided in a shell and is pressed against the end frame 13 by a spring 27. It is therefore not possible to reduce the distance between the middle hoop 15 and the end frame 13 by means of compressive forces on the strut rod 23. If, however, a tensile force acts on the strut rod 23, the spring 27 can be compressed as a result and the stamp 26 pulled out. Since the middle hoop 15 can thereby move in the direction of the end frame 14, overextension of the bellows 12 between the middle hoop 15 and the end frame 14 is avoided.

In the embodiments described previously, the cables 16 are held together by clips 17 to form a strand. Moreover, no further measures are provided for stabilizing the cables 16. The path taken by the cables 16 in the intermediate space between the vehicle front part 10 and the vehicle rear part 11 is determined solely from the inherent stability of the cables 16.

Figure 7:
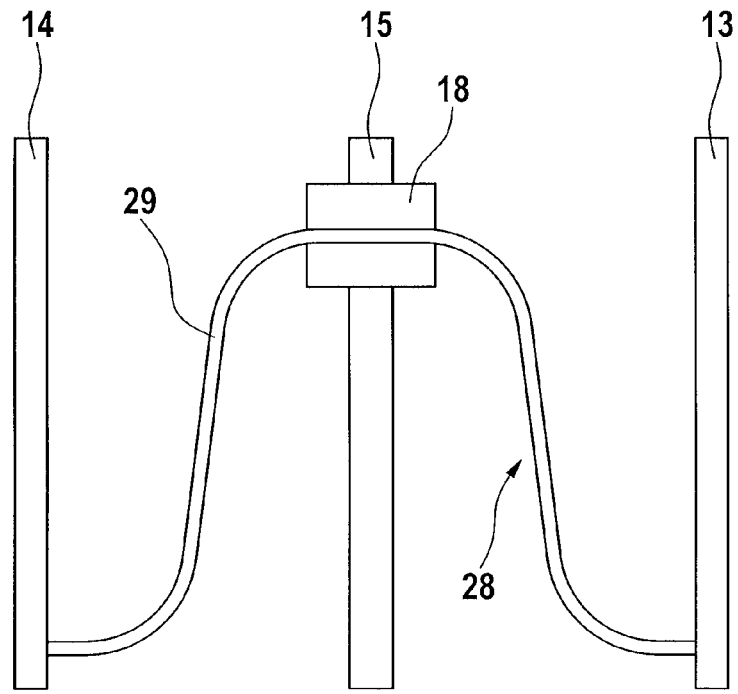
FIG. 7 shows a view from above of a cable guide.
Figure 8:
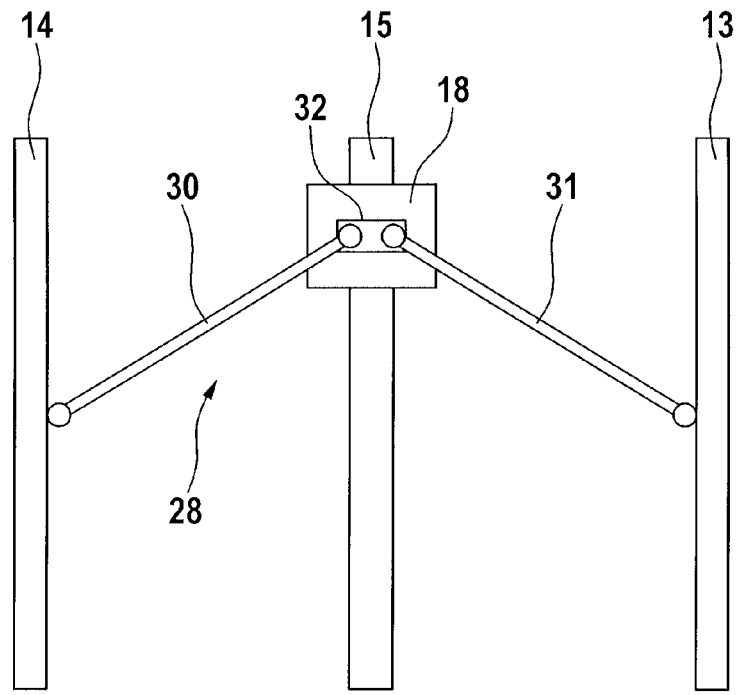
FIG. 8 shows the view from FIG. 7 for another embodiment.

In other embodiments, as illustrated by way of example in FIGS. 7 and 8, an additional cable guide 28 is provided. For the sake of better clarity, the cables themselves, which are held by the cable guide 28, are not illustrated in FIGS. 7 and 8. In FIG. 7, the cable guide 28 is formed by a leaf spring 29.

The leaf spring 29 extends along a curved path through the intermediate space between the end frame 13 and the end frame 14. In the region of the middle hoop 15, a bearing counterpart is connected to the leaf spring 29, said bearing counterpart interacting with the guide surface 19 of the bearing trough 18. Therefore, in this embodiment, it is not the cables directly, but rather the cable guide 28 which receives the cables, which is mounted in the guide surface 19. In FIG. 8, the cable guide 28 comprises two strut rods 30, 31. The strut rods 30, 31 extend from the end frames 13, 14 as far as a block 32 arranged above the middle hoop. The block 32 forms the bearing counterpart which is guided on the guide surface 19 of the bearing trough 18.

The invention claimed is:

1. A middle hoop system for a vehicle joint which is arranged between a vehicle front part and a vehicle rear part of a vehicle and forms a passage between the vehicle front part and the vehicle rear part, comprising a cable extending along a curved path between the vehicle front part and the vehicle rear part, the middle hoop surrounding the passage, and the cable being arranged above the passage, and a bearing being provided between the cable and the middle hoop, wherein the bearing has a guide surface and a counterpart, wherein one of the guide surface or the counterpart is connected to the middle hoop and the other of the guide surface or the counterpart is connected to the cable, and wherein a relative movement of the bearing occurs in a longitudinal direction between the guide surface and the counterpart.

2. The middle hoop system as claimed in claim 1, wherein the bearing permits a relative movement in the transverse direction of the vehicle between the cable and the middle hoop.

3. The middle hoop system as claimed in claim 2, wherein the bearing comprises a ball running on the guide surface.

4. The middle hoop system as claimed in claim 2, wherein the bearing provides defined guidance in the vertical direction.

5. The middle hoop system as claimed in claim 2, wherein the guide surface is provided with an encircling border.

6. The middle hoop system as claimed in claim 2, wherein a cable guide which extends between the vehicle front part and the vehicle rear part is provided, to which the cable is fastened.

7. The middle hoop system as claimed in claim 1, wherein the bearing comprises a ball running on the guide surface.

8. The middle hoop system as claimed in claim 7, wherein the bearing provides defined guidance in the vertical direction.

9. The middle hoop system as claimed in claim 7, wherein the guide surface is provided with an encircling border.

10. The middle hoop system as claimed in claim 7, wherein a cable guide which extends between the vehicle front part and the vehicle rear part is provided, to which the cable is fastened.

11. The middle hoop system as claimed in claim 1, wherein the bearing provides defined guidance in the vertical direction.

12. The middle hoop system as claimed in claim 11, wherein the guide surface is provided with an encircling border.

13. The middle hoop system as claimed in claim 11, wherein a cable guide which extends between the vehicle front part and the vehicle rear part is provided, to which the cable is fastened.

14. The middle hoop system as claimed in claim 1, wherein the guide surface is provided with an encircling border.

15. The middle hoop system as claimed in claim 1, wherein a cable guide which extends between the vehicle front part and the vehicle rear part is provided, to which the cable is fastened.

16. The middle hoop system as claimed in claim 1, wherein a strut rod is provided, said strut rod being coupled to the middle hoop and permitting rotation of the middle hoop about a vertical axis, the strut rod producing a connection to the vehicle front part or to the vehicle rear part.

17. The middle hoop system as claimed in claim 16, wherein a minimum distance between the middle hoop and the vehicle front part or vehicle rear part is defined by a normal state of the strut rod.

18. The middle hoop system as claimed in claim 16, wherein the distance between the middle hoop and the vehicle front part or vehicle rear part, which distance is defined by the strut rod in the normal state, can be increased by tensile force.

19. A middle hoop system for a vehicle joint which is arranged between a vehicle front part and a vehicle rear part of a vehicle and forms a passage between the vehicle front part and the vehicle rear part, comprising a cable extending along a curved path between the vehicle front part and the vehicle rear part, the middle hoop surrounding the passage, and the cable being arranged above the passage, and a bearing being provided between the cable and the middle hoop, wherein the bearing has a guide surface, and wherein the guide surface permits a relative movement in the longitudinal direction of the vehicle between the cable and the middle hoop, wherein a cable guide which extends between the vehicle front part and the vehicle rear part is provided, to which the cable is fastened, and wherein the cable guide defines a path of fixed length between the vehicle front part and the vehicle rear part.

20. The middle hoop system as claimed in claim 19, wherein the cable guide comprises a leaf spring.

* * * * *